United States Patent

[11] 3,584,296

| | | | |
|---|---|---|---|
| [72] | Inventor | Peter Caleb Frederick Wolfendale<br>Bletchley, England | |
| [21] | Appl. No. | 774,033 | |
| [22] | Filed | Nov. 7, 1968 | |
| [45] | Patented | June 8, 1971 | |
| [73] | Assignee | Automatic Systems Laboratories Limited<br>Leighton, Buzzard, Bedfordshire, England<br>a part interest | |
| [32] | Priority | Nov. 15, 1967 | |
| [33] | | Great Britain | |
| [31] | | 51976/67 | |

[54] IMPEDANCE BRIDGE APPARATUS HAVING LEAD WIRE RESISTANCE COMPENSATION MEANS
8 Claims, 14 Drawing Figs.

[52] U.S. Cl. .................................................. 324/57B,
324/65 B, 324/140 D
[51] Int. Cl. ..................................................... G01r 27/00,
G01r 27/02

[50] Field of Search ........................................... 324/57,
140, 57 B, 65 B, 140 D

[56] References Cited
UNITED STATES PATENTS
1,465,352  8/1923  Dobson .......................... 324/57

*Primary Examiner*—Rudolph V. Rolinec
*Assistant Examiner*—Ernest F. Karlsen
*Attorney*—Lawrence E. Laubscher ABSTRACT: A bridge circuit for the comparison of the values of electrical impedances. The novel feature is that an additional source of electrical energy is provided which is connected into the bridge circuit in such a way as to ensure that the current through or the voltage across the impedances are in a predetermined ratio. This prevents for example, the resistances of the lead wires affecting the accuracy of the bridge.

PATENTED JUN 8 1971

Peter C. F. Wolfendale
INVENTOR

BY
Lawrence E. Laubscher
ATTORNEY

Peter C.F. Wolfendale
INVENTOR

BY
Lawrence E. Laubscher
ATTORNEY 3,584,296

1

IMPEDANCE BRIDGE APPARATUS HAVING LEAD WIRE RESISTANCE COMPENSATION MEANS

This invention relates to circuit arrangements for the measurement of electrical impedances. More especially it relates to circuit arrangements for the measurement of the ratio between the values of two electrical impedances which, for example, may be resistances, capacitances, or inductances.

When impedance ratios are measured by means of the well known Wheatstone bridge arrangements error may arise due to the resistances of the leads connecting said impedances to the voltage source and the resistances of the leads connecting the potentiometer and detector to said impedances. It is an object of the present invention to provide a circuit arrangement for the measurement for such impedances in which this disadvantage is overcome or reduced.

According to the invention there is provided a circuit arrangement for the measurement of the ratio between the value of a first electrical impedance and the value of a second electrical impedance comprising first generator means adapted to drive electrical current through at least one of said impedances, a reference potentiometer, first detecting means for enabling taps on said potentiometer to be set in such a way that the ration of the voltages on two parts of the potentiometer bears a predetermined ratio to the ratio of the values of one of the electrical characteristics, voltage and current, related to the two impedances, second detecting means for detecting current in a lead connecting one of said impedances to the potentiometer, and a second generator controlled by said second detector and connected to at least one of said impedances so as to ensure that one of the electrical characteristics, voltage and current related to the two impedances are in a predetermined ratio.

In order that the invention may be clearly understood and readily carried into effect it will now be described by way of example with reference to the drawings in which:

FIG. 1 is the diagram of a circuit arrangement shown partially in schematic form and explanatory of the invention, FIG. 2 is the diagram a circuit arrangement shown partially in schematic form according to the invention, FIG. 3 is the diagram, partially schematic, of the circuit showing a servo arrangement for use with the arrangement shown in FIG. 2, FIG. 4 is the diagram, partially schematic, of another circuit arrangement according to the invention, FIG. 5 is a diagram showing practical details of the arrangement shown in FIG. 4 for use with AC, FIG. 6 is a diagram showing practical details of the arrangement shown in FIG. 4 for use with DC, FIG. 7 is a diagram showing a modification of the arrangement shown in FIG. 5, FIG. 8 is a explanatory diagram showing the circuit of an arrangement for comparing values of impedances, FIG. 9 is the diagram of a modification of the arrangement shown in FIG. 8 which is according to the invention, FIG. 10 is a diagram showing further practical details of the arrangement shown in FIG. 9.

Figure 1:
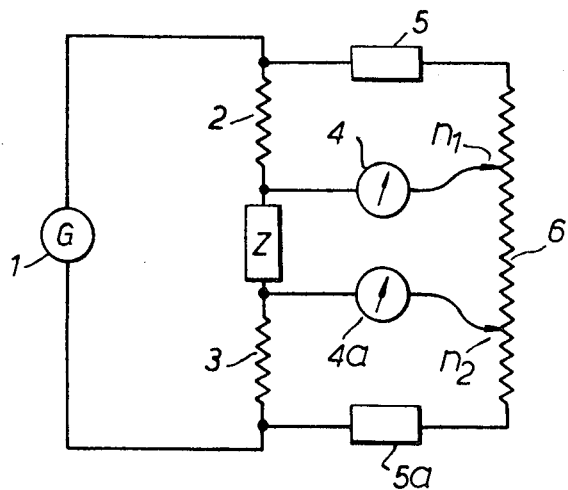

Referring to FIG. 1 the circuit illustrated is an arrangement for measuring the ratio of the values of resistors 2 and 3 by comparing the potential drop across each. The element 1 is a generator which causes a current to flow through the resistors which are connected in series. The impedance of the leads connecting resistors 2 and 3 is represented by the impedance Z. It will be seen that the leads from the generator 1 to the resistors 2 and 3 are current leads and the remaining leads, to

2 the right of the resistors 2 and 3, are potential leads. Because these current and potential leads do not have zero resistances, it is necessary to avoid measuring their resistance as part of the resistance whose value is required. This can be achieved by using a reference potential divider 6 of very high impedance, and two detectors 4 and 4a. The ends of the potential divider 6 are connected to the respective ends of the resistors 2 and 3 via the resistors 5 and 5a which may merely represent the resistance of the leads and the junction of 2 and Z and 3 and Z are connected via the detectors 4 and 4a to respective taps $n_1$, $n_2$ on said potential divider. If no current flows along the potential leads via 5 and 5a to potentiometer 6, and the taps $n_1$ and $n_2$ are adjusted until no current flows in either of the detectors 4 and 4a then the ratio of the two elements 3 and 2 will be $(n_1-0)$ to $(1-n_2)$ where the total range of the taps is from 0 to 1 at the extremes of potential divider 6. If one of the resistors 2 and 3 is a reference standard, then the value of the other is indicated.

In practice it is difficult to make element 6 sufficiently high impedance and error occurs due to the unwanted potential drop in elements 5 and 5a. One method of overcoming these difficulties according to the invention is illustrated in the circuit arrangement shown in FIG. 2. The arrangement is similar to that shown in FIG. 1 but a second generator is provided to supply the potential divider 6. The second voltage source shown at 7 is derived from the first voltage source 1 via an adjusting means shown symbolically at 8. A detector 9 is connected in series with the resistor 5a and is used to measure the current flowing between the points 10 and 11 which are the respective ends of resistor 3 and potential divider 6. The adjusting means 8 controlling generator 7 is then adjusted until the current measured by the detector 9 is zero thus ensuring that no current flows through resistor 5a. The points $n_1$ and $n_2$ are then adjusted until the detectors 4 and 4a indicate that there is zero current in them or zero voltage across them. When all three detectors 9, 4 and 4a indicate zero current or potential drop across them the measured ratios indicated by $n_1$ and $n_2$ are a true indication of the ratio of the potentials across elements 2 and 3 due to the current flowing through them due to generator 1. It will be appreciated that difficulties due to the resistances of the current and potential leads have been substantially overcome because the detector 9 has caused the conditions in the circuit to be adjusted to ensure that no current flows in the potential leads.

Although in the above description it has been indicated that the voltage source 7 is derived from the voltage source 1, in an alternative arrangement according to the invention the situation can be reversed so that generator 7 is the prime source of supply and generator 1 receives its supply as a slave via the element 8.

Element 8 is a control which is adjusted manually and the balance indicated by detector 9 can be observed visually. Alternately a detector 9 causes a motor to operate and adjust the balance set by the device 8 automatically and continuously. A preferred method is illustrated in FIG. 3 in which there is disclosed a circuit which may be referred to as a solid-state servo.

Figure 2:
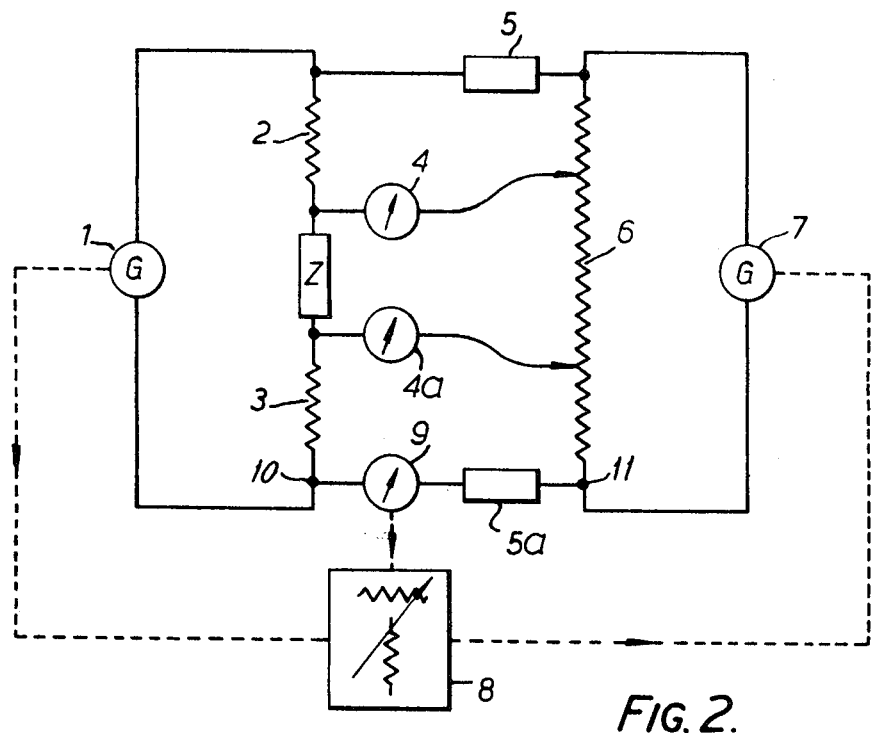
Figure 3:
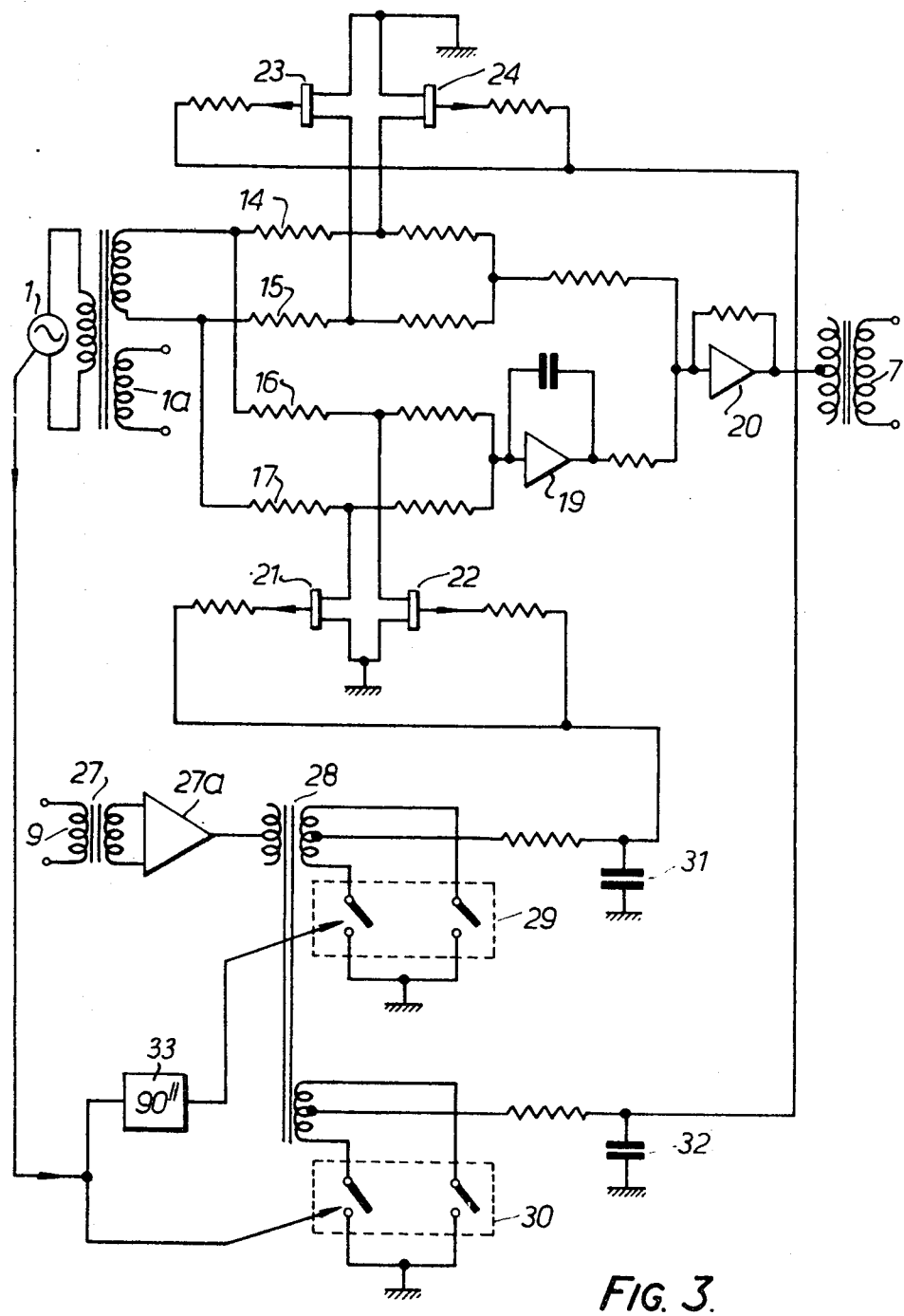

FIG. 3 represents a modification of the arrangement shown in FIG. 2 which includes the aforesaid solid-state servo arrangement, but parts of the arrangements which are the same as already shown in FIG. 2 are not shown in FIG. 3. The generator is shown at 1 and a part of the output of the generator apart from being supplied via the terminals 1a to the resistors 2 and 3 (not shown in FIG. 3) is modified to provide the second generator output which appears at the output terminals indicated at 7 to be supplied to the potentiometer 6 (not shown in FIG. 3). The amplitude and phase of the signal appearing at 7 is controlled by a phase sensitive detector whose input is shown at 27 which corresponds to the element 9 in FIG. 2. In operation any signal which appears at 27 (9 in FIG. 2) is amplified by the amplifier 27a and applied to two phase sensitive detectors 29 and 30 via said amplifier 27a and transformer 28. The gating signals for operating these two detectors which are shown symbolically as switches are obtained from the main source 1 and one of the detectors is driven via a phase-shift device 33 which introduces a quadrature phase-shift so that the detectors are responsive to the 'in-phase' and 'quadrature' components respectively. Said switches of said detector are preferably field effect transistors which are switched by said gating signals. The output of each of these detectors is a signal whose amplitude and polarity represent the input at the detector 9 of the 'in-phase' and 'quadrature' components of the balance signal. These two signals are used to vary attenuator elements 21 and 22, 23 and 24 which control the amplitude and sense of the transfer between generator 1 and the output terminals 7. The elements 21, 22, 23 and 24 are field effect transistors which have the advantage that they can be used as variable resistors by the application of a DC signal to their gates. It will be apparent that alternative attenuator devices may be used here in accordance with the invention, for example, photoelectric cells which respond to a variation of light, magneto-restrictive elements whose resistance varies with applied magnetic field, variable permeability materials which can vary in impedance with superimposed DC, thermistor which vary in resistance when heated etc. These all have in common the feature that they can control the signal transfer from one part of a circuit to another in response to the output of a phase-sensitive detector. Resistors 17 and 16 are connected in series with the transistors 21 and 22 to serve as potentiometers the outputs of which are signals of opposite sense which are summed and applied to an amplifier 19 which shifts the summed signals in phase by 90° and applies them to a further amplifier 20. Similarly resistors 15 and 14 are connected in series with the transistors 23 and 24 to serve as potentiometers for the in-phase signals and the summed signals there from are applied to the amplifier 20. The composite in-phase and quadrature signals are now reapplied to the circuit via the terminals 7 and potentiometer 6 (FIG. 2) in such a sense that a negative feedback loop exists. The response of this can be adjusted like any other servosystem and the loop gain in this case can be very high, if required, so that only a small error exists at the detector input 27 (detector 9 in FIG. 2).

Although an AC control system has been described above with respect to FIG. 3, the system can be made to work as a DC controller by leaving out the transformers and using appropriate DC elements. The phase sensitive detector is then no longer required but the time constant elements 31 and 32 in the output of the phase sensitive detector 30 are still required to control the loop response. In practice these elements may be more complex then the simple RC filter shown, both in the AC case and the DC case, but their design will be apparent to those skilled in the design of servomechanisms.

The circuit of FIG. 2 with the modification shown in FIG. 3 will operate as a semiautomatic system because generators 1 and 7 continuously balance each other so that no current flows in the potential leads 5 and 5a. These leads can therefore be of fairly large impedance without introducing errors. Detectors 4 and 4a can now be balanced manually, or preferably they are used to operate a control system which automatically adjusts the tapping points $n_1$ and $n_2$ until balance is reached. There will then be three automatic balancing circuits in the bridge, one of which is continuous, and the other two designed each to produce a signal which is in digital form so that $n_1$ and $n_2$ may be recognized accurately.

Figure 4:
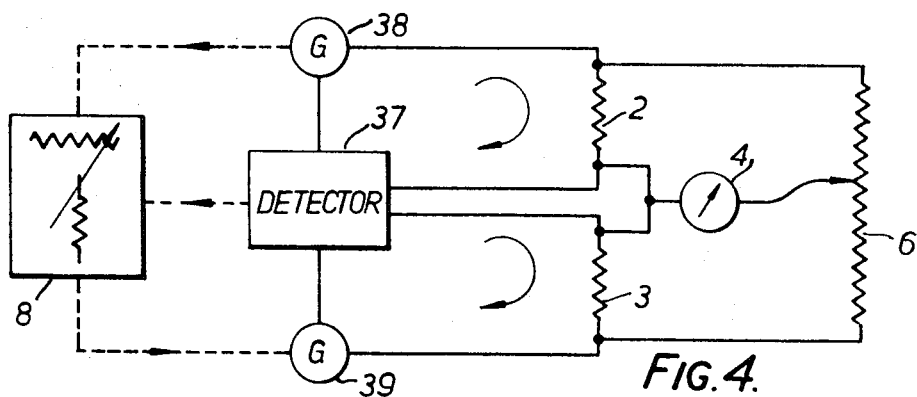

The circuit arrangement illustrated in FIG. 4 makes use of the same principles as already described with respect to FIG. 2 but in this case current is applied separately to the two resistors 2 and 3 by the separate generators 38 and 39 respectively. The current provided by generator 39 is derived from generator 38 and is controlled in such a way by means of the detecting arrangement 37 and the control arrangement 8 that the currents in the two resistors are equal or bear some convenient ratio to each other. When the currents in the two resistors as detected by 37 have been balanced in this way the ratio of the potential drops across resistors 2 and 3 is a measurement of the ratio of their impedances and this ratio is measured by means of a reference divider 6 connected across the ends of resistors 2 and 3 and the detector 4 connected from a tap on potential divider 6 to the junction of resistors 2 and 3. The tap on the potential divider 6 is arranged to provide an accurate digital balance. If required a third detector may be provided which is arranged to stop the potential divider 6 drawing current along the potential leads as was described with reference to FIG. 2 and this can be a second continuous solid state servo such as been described with respect to FIG. 3. Only one accurate digitized ratio measurement is then required.

Figure 5:
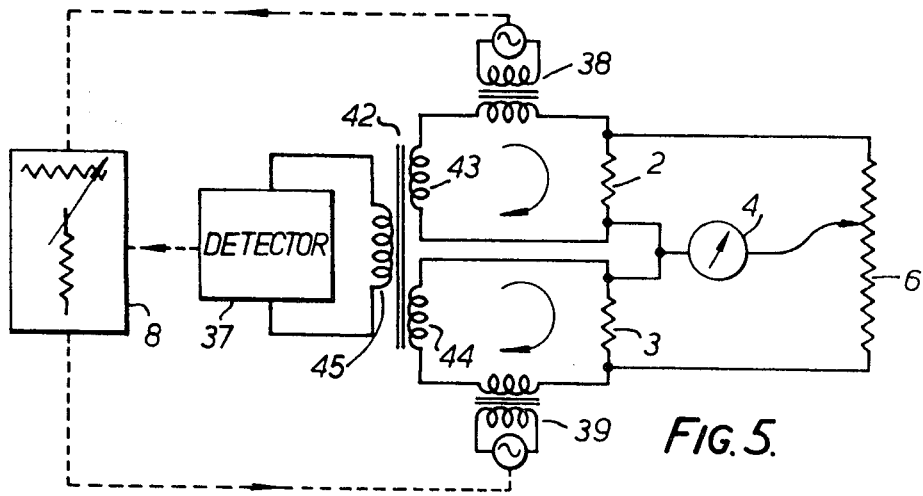

In FIG. 5 is illustrated the form which the circuit of FIG. 4 can take when the generators are AC and illustrates the nature of the detector 37. The generators 38 and 39 are shown as connected to the circuit by transformers and the return leads from resistors 2 and 3 are passed respectively through two windings 43 and 44 of a transformer 42 in such a way that the currents through said windings are in opposition and proportional to their respective turns. The magnetization in the transformer core will be zero and the signal induced in the secondary winding 45 will be zero when the currents are equal so that the current applied to the control arrangement 8 in said circumstances will also be zero. The transformer 42 may take several forms and is not restricted to that shown in the Figure. For example a double transformer in which there is a inner and outer core, one enclosed within the other, may be used. Each has its own windings and the coupling between them may be better than can be provided with the conventional single transformer. In such a case better accuracy may result from the use of such a transformer for element 42.

Figure 6:
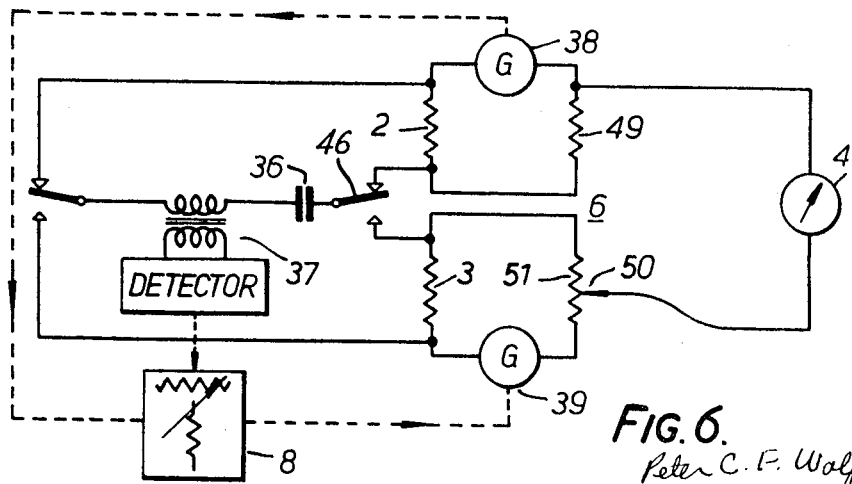

In FIG. 6 is shown the form which the FIG. 4 may take when the generators are DC in this the comparator arrangement of 37 of FIG. 4 is constituted by a transformer and capacitor 36 which can be switched between two positions, namely either across the resistor 2 or across the resistor 3 so that when the current in these elements is in the correct sense and proportional to their conductances the voltage change when 46 is switched from one to the other is zero and hence zero signal is detected in the transformer secondary. A similar circuit could be used to compare the potentials across resistor 49 and the part of the resistance 51 up to the tap 50. If the current due to the two generators is adjusted so that the potentials across 2 and 3 are equal then the ratio of 2 to 3 may be calculated from the comparison of the value of resistor 49 with the value of the part of the resistor 51 to the tap 50.

Figure 7:
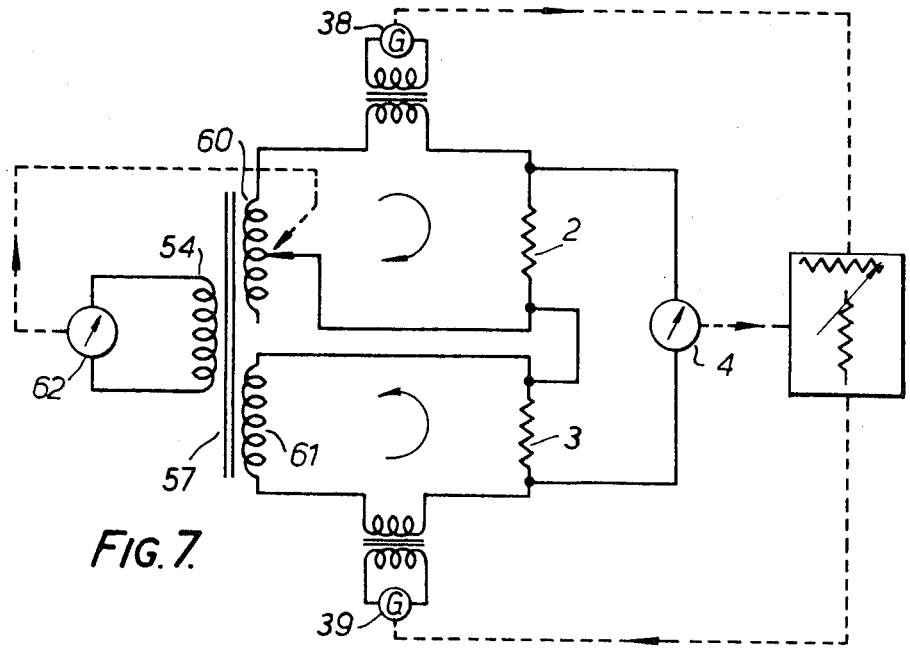

The circuit arrangement shown in FIG. 7 is similar to that shown in FIG. 5 but in this case the current flow in the two resistors is of opposite sense and the detector 4 is used to adjust generator 39, as shown until the potentials across the two elements 2 and 3 are identical. Again the automatic adjustment of the relative currents of the generators 38 and 39 may be effected as described above by a servomechanism. The currents flowing in the two elements 2 and 3 will now be proportional to their impedances since the potential drops across them are equal. The transformer 57 having two primary windings respectively each in circuit with one of the impedances 2 and 3 is used to determine the ratio of these currents by varying the ratio of the primary windings 60 and 61 until the signal in the secondary winding 54 is zero. Again this transformer is of the double type referred to above and also the adjustment of the transformers is by automatic means in which an error at detector 62 causes digital switching circuits to adjust the number of turns in winding 61 by switching means until balance is restored. The number of turns on winding 61 can now be digitally indicated and will be a measure of the ratio of resistance 2 to resistance 3.

Figure 8:
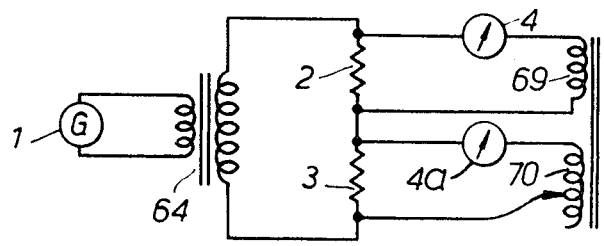

In the arrangement illustrated for explanatory purposes in FIG. 8 a generator 1 is arranged to drive a current via a transformer 64 through resistive elements 2 and 3. The potentials across each of these elements are opposed by the potentials induced in windings 69 and 70 which are mutually coupled and connected across the elements 2 and 3 respectively. Equality is established by means of detectors 4 and 4a which are connected in series respectively with the elements 2 and 3 and their respective windings 69 and 70. The ratio of one winding to the other, that is the ratio of the number of turns on 69 to the number of turns on 70 is the ratio of the potentials and therefore the ratio of the resistance elements 2 and 3.

Figure 9:
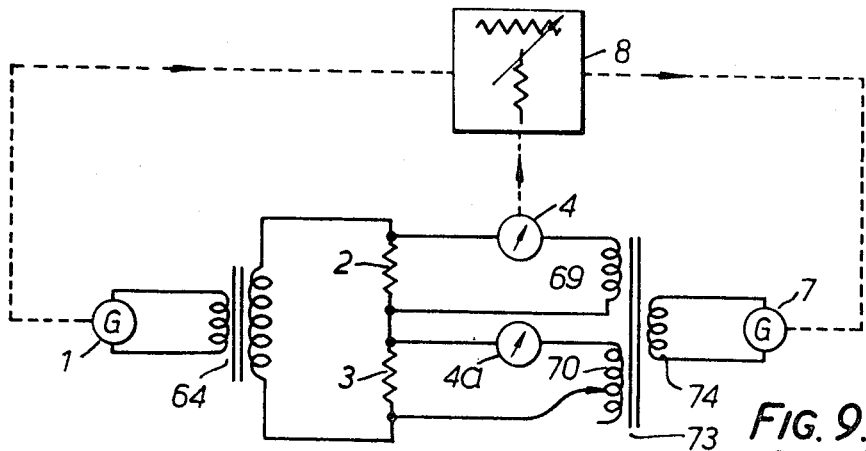

The circuit arrangement shown in FIG. 9 which is an arrangement according to the invention is an improvement on that shown in FIG. 8 in that a second generator 7 is additionally coupled to the windings 69 and 70 so as to reduce the current drawn by the potential leads. Again the ratio of the amplitudes of the generators 1 and 7 may be adjusted manually or preferably as indicated in the Figure by automatic means such as those described with reference to FIG. 3.

The arrangement shown in FIG. 9 can be improved if the transformer including the windings 69 and 70 is a double transformer, comprising an outer torroid surrounding an inner torroid, winding 74 connected to generator 7 being on the inner core and the windings 69 and 70 being on the outer core. This is a preferred form for this type of circuit since windings 69 and 70 will have greatest accuracy of ratio to each other when they draw no current.

Figure 10:
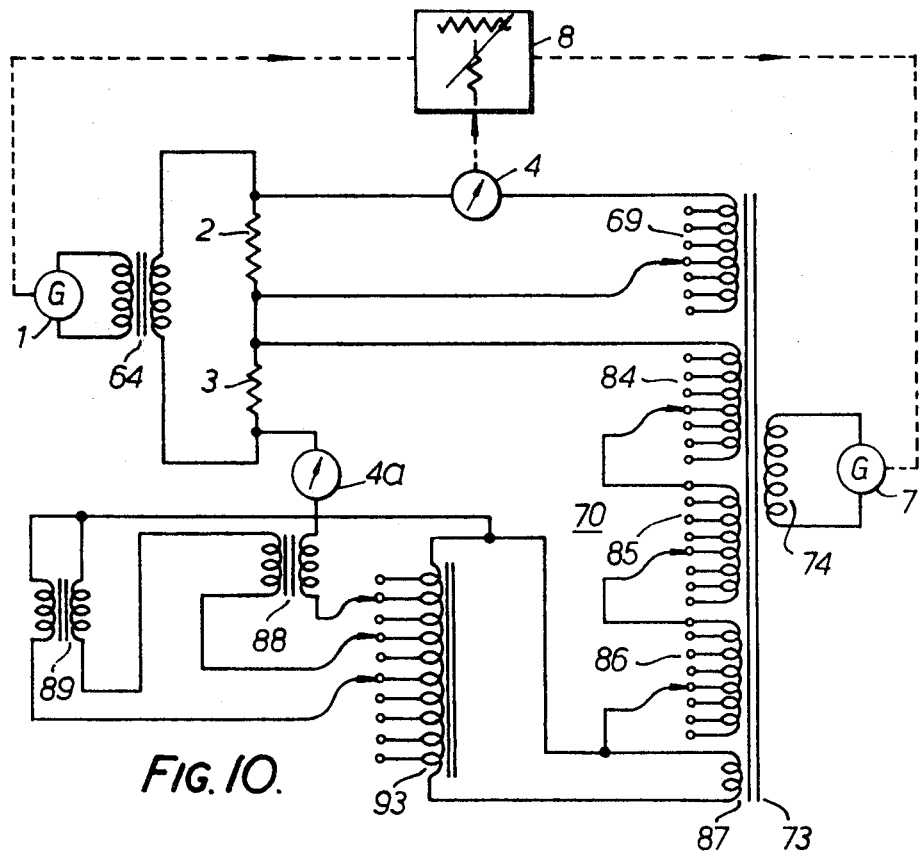

In FIG. 10 is shown the arrangement already described with reference to FIG. 9 in greater detail. Either generator 1 or generator 7 may be regarded as the master generator with the other serving as a slave to it via a controller 8, although as illustrated 1 is the master and 7 is the slave. The controller 8 is preferably a circuit similar to that already described with reference to FIG. 3. The detector 4 controls the operation of the controller 8 in such a way that no current flows in the windings 69 and the potential of the selected part of 69 is equal to that across resistor 2. The winding 84, 85 and 86 which constitute the winding 70 are groups of 10 times 100, 10 times 10 and 10 times 1 turns respectively, although if desired there could be more than 10 groups and the ratios may alternatively be binary 1, 2, 4, 8, 16 etc. or binary-coded decimal. The sequence chosen will be that which is convenient to the particular purpose for which the instrument is designed. In order further to subdivide the voltage output from the secondary windings so as to get finer and finer resolution a further winding 87 is provided which is connected to a separate transformer 93. For example winding 87 may be one turn on the outer core of double transformer 73 and transformer 93 may have 100 turns tapped at intervals of 10 turns. Transformer 88 and 89 connected in tandem across tappings of transformer 93 are 10 to 1 transformers connected in such a way as to subdivide the potential due to the wind 87 with a further resolution of 1 in 1000. In this way the potential of the combined windings 84, 85, 86, 87, etc. which is used to balance the potential across resistor 3 can be adjusted with a resolution of 1 in $10^6$. This resolution could if desired be extended to 1 in $10^8$ or 1 in $10^9$ by using Kelvin Varley dividers between the windings 93 and 88, 89 in the well-known manner.

Figure 11:
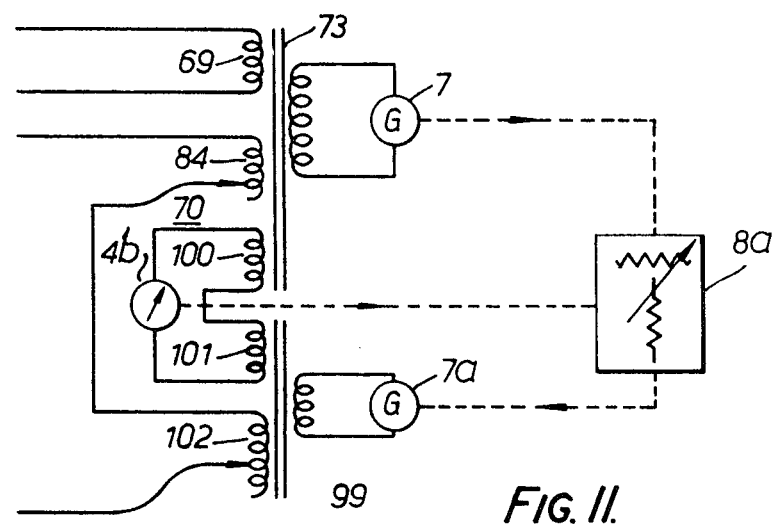
FIG. 11 shows a detail of a modification of the arrangement shown in FIG. 10.

In certain circumstances it may be that the current drawn form the winding 87 to energize transformer 93, 88 and 89 is too large and causes inaccuracy. The modification of the circuit associated with transformer 73 which is shown in FIg. 11 is designed to reduce this disadvantage. It is to be understood that parts not illustrated are the same as shown in FIG. 10. A second double transformer 99 is made slave to a first double transformer 73 by comparing the potentials in the two secondaries one in each outer core. These two secondaries 100 and 101 are compared by means of a detector 4b which controls the device 8a which is used to control the supply source 7a which drives transformer 99.

The ratio of the two windings 100 and 101 may now be such that winding 102 on the transformer 99 can be used to interpolate between taps on the winding 84. For example if winding 100 has one turn and winding 101 has 1000 turns and the voltages are made to balance, then the 1000 turns on winding 102 will correspond to 1 turn on winding 84 and an accurate resolution of 1 in $10^6$ is obtained. If a resolution of 1 in $10^9$ is required the circuit is either repeated or a similar circuit to that of FIG. 10 is used with Kelvin Varley dividers since the possible errors are now much less significant.

A further feature of FIG. 10 is that winding 69 is tapped so that when the ratio of the two elements 2 and 3 is such that the potential across 3 is less than one-tenth of that across 2, then the turns on winding 69 can be reduced by a factor of 10 so that the resolution of the other group of windings is restored. This has the effect of moving the decimal point along and enables elements 2 and 3 to be compared when they differ by a factor of $10^3$ or more with the full resolution of the multiple windings 84, 85, 86 etc.

Another use for the variable winding 69 is that it can be made to agree with the value of element 2 so that where for example 2 is a reference element of noninteger value a trimming of the number of turns on winding 69 will mean that the value of 3 can be interpreted as a real value by direct reading from the number of turns on the other winding instead of by applying a correction factor.

It may be that instead of constant voltage across elements 2 and 3 or constant current through them as the arrangement described in FIG. 11 would give, depending on whether 1 or 7 is the master generator, that some combination of the two would be better, for example constant power dissipation in one of the elements. In this case the current through the resistor would be sensed by some convenient means and also the voltage across the resistor would be controlled. For example in FIG. 10 if 2 is the reference resistor and 3 the variable element then if the product of the two potentials is kept constant the power in the variable resistor is constant. Alternatively the voltage across the variable element can be monitored and compared with a constant voltage from the same source. A control circuit can be provided which demands a square law relation between the two values. The master generator in the case of element 7 now has its output varied until the relation is satisfied. In this way the voltage across the resistor 3 varies as the square of its resistance and hence the power dissipated in that element remains constant.

Figure 12:
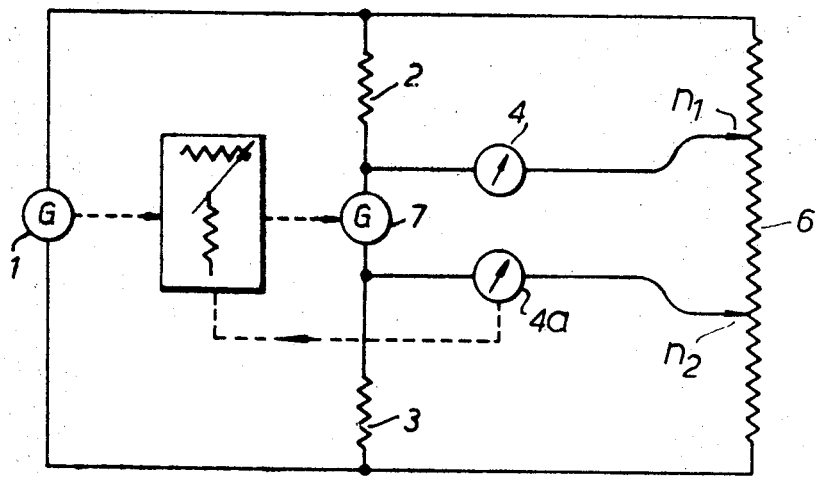
FIG. 12 is the diagram of a circuit arrangement which is similar to that shown in FIG. 2.

The arrangement shown in FIG. 12 which is related to that shown in FIG. 2 is a bridge circuit for comparing the impedance of two elements 2 and 3. As will be seen from the Figure a generator 1 is connected in series with the element 2, a generator 7, and the element 3 in that order. The potential divider 6 is connected across the terminals of generator 1. A detector 4 is connected from the junction of generator 7 and element 2 to a tap $n_1$ on said potential divider 6 and a detector 4a is connected from the junction of generator 7 and element 3 to a tap $n_2$ on said potential divider 6. The generator voltage 7 is derived from generator 1 via a controller 8 and is of such a value that its voltage combined with the potential drop across element 2 is a correct value for the ratio $n_2$ set on the potential divider. If this is not the case detector 4a causes controller 8 to provide more or less voltage at 7 until 4a has zero voltage across it. Detector 4 is now used to control the tapping $n_1$ until the voltage across 4 is zero. Then $n_2/n_1$ represents the ratio of the elements 3 to 2 and may be direct reading.

Figure 13:
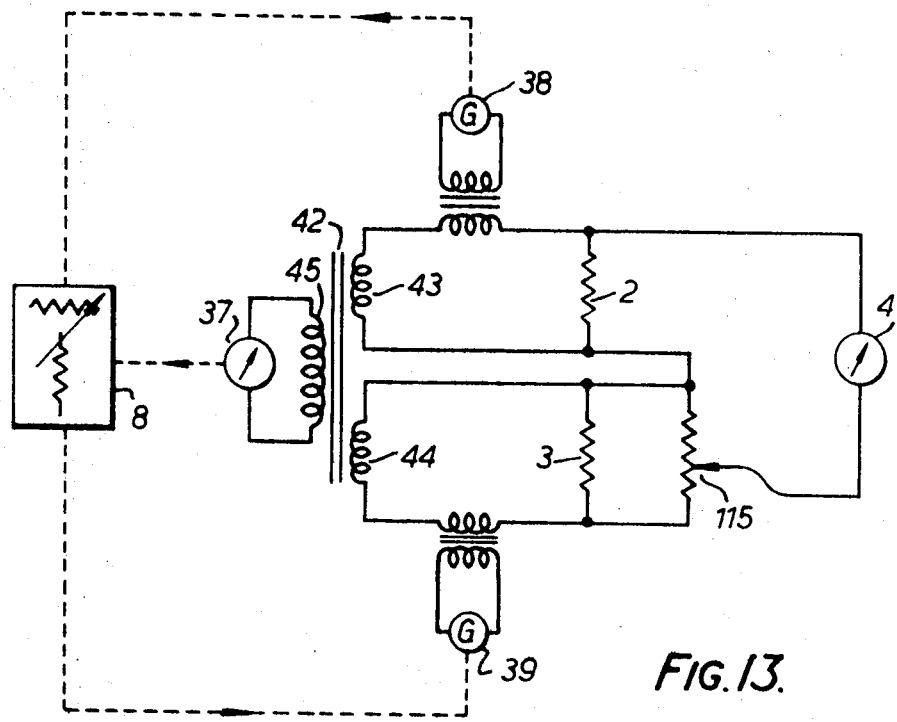
FIG. 13 is a further modification of that shown in FIG. 5.

The arrangement shown in FIG. 13 is a modification of that shown in FIG. 5 in which the ratio of the potential drops across elements 2 and 3 is found by means of a potential divider 115 of high impedance and a detector 4. The tap on 115 is adjusted until there is zero potential across 4 and the setting of the tap determines the ratio 2 to 3. 115 may be made to draw negligible current along the potential leads from element 3 by being made very high impedance or by the use of feedback methods as described.

Figure 14:
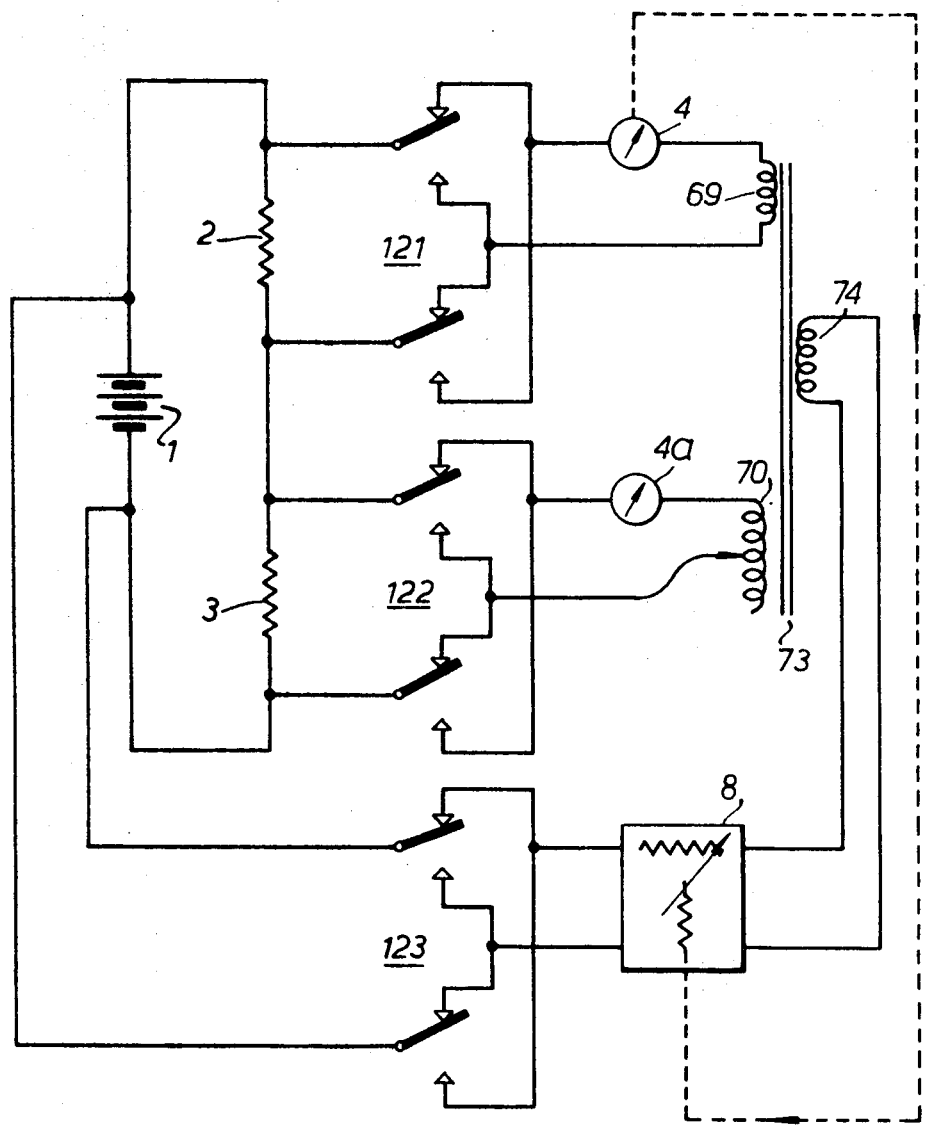
FIG. 14 is a modification of that shown in FIG. 9 for use with DC.

The arrangement shown in FIG. 14 is a modification of that shown in FIG. 9 for use when the supply voltages are DC. A DC supply 1 drives a current through the elements 2 and 3 in series. The transformer 73 is a precision transformer, for example a double transformer in which the winding 74 is the inner winding and the windings 69 and 70 are the outer core windings. Detector 4 is used to adjust the energization of said inner winding 74 via the controller 8 and detector 4a is used to adjust the position of the tap on winding 70. The vibrating switches 121, 122, 123 are all driven synchronously at some convenient rate so that the signal in said transformer 73 is effectively AC and is compared with the signals across the resistors 2 and 3. The contacts are thus effectively modulators which convert the DC into an AC signal.

Although in the above description the impedances to be compared have been described as resistors, it will be readily appreciated that the same principles apply if the impedances are, for example, capacitors or inductors and it is intended that the scope of the invention includes the application to such other forms of impedance.

What we claim is:

1. Apparatus for measuring the ratio between first and second electrical impedances, comprising:

means including a first voltage source (1) and first leads of finite resistance for energizing said impedances in series;

reference voltage divider means (6) connected across the remote ends of said first and second impedances, said voltage divider means including adjustable taps;

second lead means connecting tapped portions of said voltage divider means in parallel across said first and second impedances, respectively;

first detector means (4) and (4a) connected in said second lead means for indicating when the divider taps are adjusted to cause tapped portions of said voltage divider means to bear a predetermined ratio to the ratio of the voltages across the first and second impedances, respectively; second detector means (9) connected between one of said remote ends of said first and second impedance and a remote end of said reference voltage divider means for indicating the total degree of unbalance of said voltage divider means relative to said first and second impedance means; and control means including a second voltage source (7) connected across said voltage divider means and operable by said second detector means for maintaining the voltages across said first and second impedances in a predetermined ratio, whereby the effect of the leads on the electrical measurement is eliminated, and a true indication of the ratio of said first and second impedances is presented.

2. Apparatus as defined in claim 1, wherein said second detector means is connected in a lead between one end of said voltage divider branch and one end of the series branch that includes said first and second impedances.

3. Apparatus as defined in claim 2, wherein said first detector means includes a first detector (4) connected in a first lead of said second lead means between one tap of said potential divider means and that end of said first impedance that is adjacent said second impedance, and another detector (4a) connected in a second lead of said second lead means between another tap and that end of said second impedance that is adjacent said first impedance.

4. Apparatus as defined in claim 2, wherein said control means includes voltage attenuating means, and servo means for controlling said attenuating means as a function of the output of said second detecting means.

5. A circuit arrangement according to claim 1 comprising a first AC generator for supplying an electrical current to two pairs of terminals connected in series for said first and second impedances respectively, a first detecting means connected in series with a first primary winding of a transformer connected across one pair of terminals, a second detecting means connected in series with a second primary winding of said transformer connected across the other pair of terminals, said first primary winding being provided with means for varying the number of turns therein, a second AC generator connected to the secondary of said transformer and means controlled by said second detecting means for controlling the relative values of the two generators.

6. A circuit arrangement according to claim 1 comprising a first pair of terminals for said first impedance, a second pair of terminals for said second impedance, a first generator connected across one terminal of each pair, a second generator connected across the other terminals of each pair, a potentiometer connected across said first generator, a first detecting means connected from one terminal of said second generator to a first variable tap on said potentiometer, a second detecting means connected from the other terminal of said second generator to a second variable tap on said potentiometer, and means controlled by said second detecting means for controlling the relative values of the two generators.

7. A circuit arrangement according to claim 1 comprising a first AC generator means adapted to supply electrical current via the first primary winding of a transformer to a first pair of terminals for said first impedance, a second AC generator means adapted to supply electrical current via a second primary winding of said transformer to a second pair of terminals for said second impedance, a conductor connecting one of each of the pairs of terminals, a potentiometer connected across said second pair of terminals, a first detecting means connected from the other terminal of said first pair of terminals to the variable tap of said potentiometer, a second detecting means connected to the secondary of said transformer, and means controlled by the output of said second detecting means for controlling the relative values of the two generators.

8. A circuit arrangement according to claim 1 comprising a DC generator for supplying an electrical current to two pairs of terminals connected in series for said first and second impedances respectively, in a path across said first pair of terminals a vibrating switch for connecting the voltage across said pair of terminals effectively to AC, a first detecting means in series with a first primary winding of a transformer, in a path across said second pair of terminals, a vibrating switch for connecting the voltage across said pair of terminals effectively to AC, a second detecting means connected in series with a second primary winding of said transformer, said first primary winding being provided with means for varying the number of turns therein, said generator being connected via a vibrating switch to convert its output effectively to AC and an attenuator controlled by said second detecting means to the secondary of said transformer.